March 30, 1948. D. A. PALMER 2,438,678
TOBACCO-PIPE SCRAPING TOOL
Filed Aug. 20, 1945
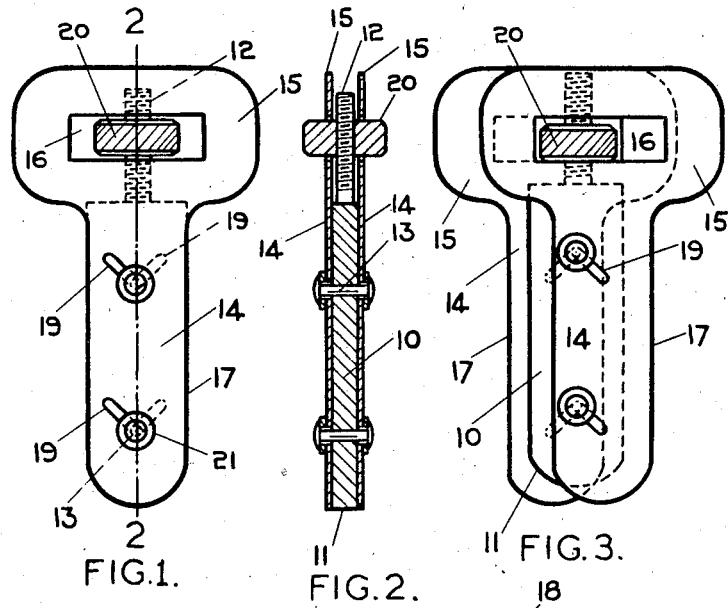
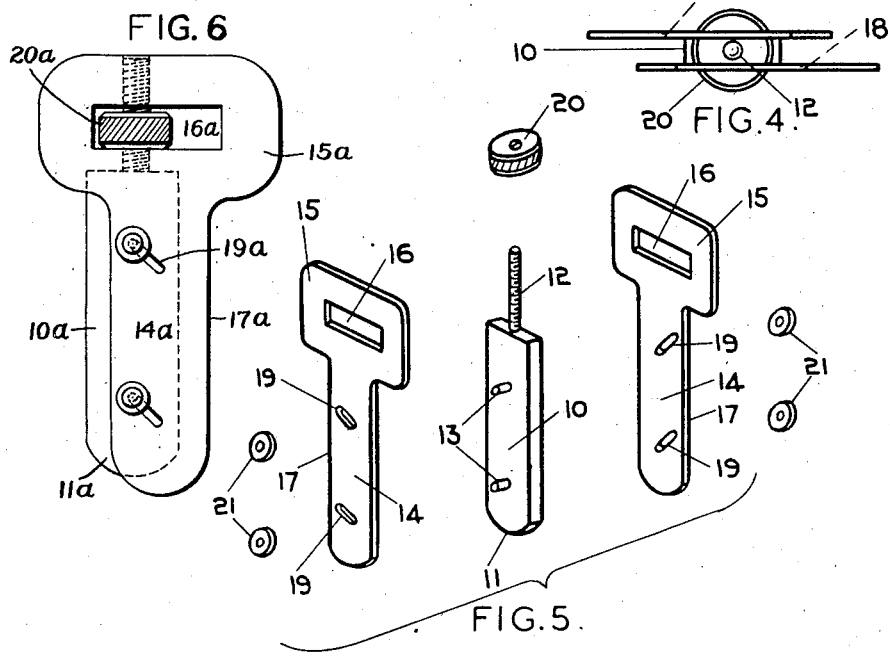
INVENTOR
Donald A. Palmer
By Watson, Cole, Grindle & Watson Patented Mar. 30, 1948

2,438,678

UNITED STATES PATENT OFFICE 2,438,678

TOBACCO-PIPE SCRAPING TOOL

Donald Ashford Palmer, Sheffield, England

Application August 20, 1945, Serial No. 611,535
In Great Britain August 31, 1944

9 Claims. (Cl. 131—246)

This invention relates to tobacco pipe scraping tools its general object being to provide improvements in the construction and operation thereof.

More particularly it is the object of the invention to provide an expanding tool by the employment of which the incrustation which normally accumulates in a pipe bowl may be removed irrespective of the thickness of the incrustation and the diameter of the pipe bowl within the limits between which the tool is designed to work.

A further object is to provide a tool which automatically tends to expand when it is rotated in the bowl of a pipe.

Another object is to preserve the regular shape of a pipe bowl when scraping it.

Other objects will become apparent on perusal of this specification.

A tobacco-pipe scraping tool according to the present invention comprises a flat-faced base, a scraper blade mounted thereon and guided to slide in relation to the base between closed and expanded positions in which latter positions an operative edge of the blade projects varying distances beyond the base and a screw device capable of thus causing relative sliding movement between the base and blade.

A scraper blade is preferably thus mounted, guided and actuated on each face of a base having more than one flat face, each blade being so guided as it slides between closed and expanded positions that operative edges of all the blades project equal distances beyond the base.

Each blade is conveniently mounted and guided on the base to slide in relation thereto in a direction which has one component normal to the longitudinal axis of the blade and another parallel to that axis.

Pin and slot connections preferably provide means for mounting and guiding the blade or blades on the base and the screw device to cause relative movement between the base and blade or blades may comprise a threaded extension of the base engaged by a nut working between two abutments carried by each blade.

In a convenient embodiment of the invention the base is a substantially rectangular strip of metal having an axially projecting screw at one end, and two identical scraper blades. Each of the blades conforms in outline to that of the base from one end thereof to adjacent the other end where each blade has a laterally extending head in which a slot is made transverse to an operative scraping edge at one side of the blade. The blades are mounted and guided one on each side of the base by the aid of rivet pins which fit into holes in the base and engage parallel slots formed in the respective blades, the slots being formed so as to be inclined toward the operative edges of the blades. The ends of the rivet pins passing through the slots are upset over washers to prevent the blades from sliding off the pins and becoming detached from the base. A nut engages the base screw and works in the slots of the blade heads to actuate the blades.

In some cases the base and the blades may be slightly tapered or curved.

In the accompanying drawings:

Figure 1 is an elevation of a tobacco-pipe scraping tool according to the present invention the parts being shown in the closed position.

Figure 2 is a sectional side view on the line 2—2 of Figure 1.

Figure 3 is a view similar to Figure 1 showing the parts in the fully expanded position.

Figure 4 is a plan of Figure 3.

Figure 5 is a perspective view on a smaller scale of the parts of the tool grouped ready for assembly.

Figure 6 shows a scraping tool in which a single scraper blade is used.

Like reference numerals indicate like parts throughout the drawings.

In carrying out the present invention a base 10 is cut out from a strip of metal and is substantially rectangular in shape, having a width which is less than the diameter of a normal pipe bowl and a length which is greater than the depth of the bowl. One end of the base is rounded as indicated at 11 to correspond with the base of the bowl and a screw 12 projects axially from the other end. Rivet pins 13 fit holes bored through the base 10 on its centre line and project on each side of the base.

Two identical blades 14 are provided. Each blade conforms in outline to that of the base 10 from its rounded end 11 to adjacent the other end where each blade has a laterally extending head 15 in which a slot 16 is made transverse to the length of the blade 14.

The edge 17 at one side of each of the blades 14 is intended to be operative for scraping purposes and may be slightly bevelled as indicated at 18 in Figure 4.

Each of the blades 14 is also formed with two parallel slots 19 inclined to its length, conveniently at about 45°, one slot being disposed adjacent the rounded end and the other adjacent the head 15 of the blade and both extending from adjacent the operative edge 17 to or beyond the centre line of the blade.

A nut 20 is provided to fit the screw 12 and is adapted to be received in the slots 16 of the two blade heads.

In assembling the parts the nut 20 is engaged on the screw 12 and one of the blades 14 is caused to register with the base 10, the rivet pins 13 passing through the slots 19 and the nut 20 engaging the slot 16 and being adjusted on the screw 12 if necessary to enable registration of the blade and base to be obtained. The other blade 14 is reversed as indicated in Figure 5 and is similarly assembled on the other side of the base 10. Finally the rivet pins 13 are upset over washers 21 thus connecting the blades 14 in sliding relationship to the base 10.

Thus assembled and connected the parts will be in the closed position of the tool illustrated in Figures 1 and 2, both blades 14 registering with the base and their heads with one another and the rivet pins 13 preferably contacting with the ends of the slots 19 adjacent the centre line of the tool.

On rotating the nut 20 to screw it towards the base 10 it will bear against an abutment of each of the blades 14 formed by one side of the slot 16 in its head and thereby move both blades longitudinally in relation to the base 10. At the same time the inclined slots 19 will cause the two blades 14 to move laterally in opposite directions in relation to the base 10 so that their operative edges 17 project equal distances beyond the base 10 and in this manner the tool may be expanded towards and into the position of the parts shown in Figures 3 and 4 to scrape a pipe bowl to the desired diameter.

Since the inclined slots 19 in each of the blades 14 are parallel, a parallel motion will be imparted to the blades and consequently a cylindrical pipe bowl may be properly and truly scraped by inserting the tool into the bowl and rotating it therein and gradually expanding it until the operative edges 17 reach the walls proper of the bowl having detached therefrom the incrustation which normally accumulates in a pipe bowl.

On rotating the nut 20 in the opposite sense it will bear against abutments formed by the other sides of the head slots 16 to retract the blades to the closed position.

It will be appreciated that the heads 15 of the blades 14 form handles enabling the tool to be rotated when the blades 14 are inserted in a pipe bowl. It is natural for the average right-handed man to rotate the tool in a clock-wise sense when scraping the bowl of his pipe and since the nut 20 projects beyond the planes in which the outer faces of the heads 15 are situated it will come within the grip of the user and will receive at least a part of the rotary force he is applying. Consequently by using a right-handed screw 12 the act of rotating the tool in the bowl of a pipe will tend also to rotate the nut 20 in relation to the tool and thereby there will be an automatic tendency to expand the tool as the incrustation is removed.

Although the construction illustrated is such that in the assembled position the operative edges 17 of the two blades 14 are parallel with one another the blades 14 may be slightly tapered so that the operative edge 17 of each converges towards the centre line or axis of the blade from the head 15.

Preferably both of the longer side edges of the blades 14 would be thus slightly tapered to converge towards one another, the base 10 being of a similar tapered formation so that in the closed position both blades register therewith.

Similarly both the blades 14 and the base 10 may be otherwise shaped, as for example, by having slightly curved side edges, to conform with variations from a cylindrical shape of a pipe bowl wall.

Although it is generally preferred that the blades 14 register with the base 10 in the closed position of the tool, they may be somewhat narrower and shorter so that in the closed position the base projects beyond them.

Figure 6 illustrates a pipe scraper in which a single blade is used. The numerals designating the different parts are the same, except for the subscript (a), as for like parts designated in the preferred embodiment, the parts performing the same function.

What I claim is:

1. A tobacco-pipe scraping tool comprising in combination a base having more than one flat face, a scraper blade mounted on each of such faces, and guided to slide in relation thereto between closed and expanded positions in which latter positions operative edges of all the blades project equal distances beyond the base faces and a screw device axially aligned with said base capable of causing such relative sliding movement between the base and each blade.

2. A tobacco-pipe scraping tool comprising in combination a flat-faced base, a scraper blade mounted thereon and guided to slide in relation thereto in a direction which has one component normal to the longitudinal axis of the blade and another parallel to that axis and a screw device axially aligned with said base capable of causing such sliding movement between the base and blade.

3. A tobacco-pipe scraping tool comprising in combination, a base having more than one flat face, said flat faces lying in planes which are parallel with respect to each other in at least one dimension, a screw axially aligned with said base and extending therefrom parallel to said flat faces, a scraper blade mounted on each face of the base and guided to slide thereon in a direction inclined to the axis of the screw between closed and expanded positions in which latter position operative edges of the blades project beyond the base faces, abutments carried by each blade and a nut engaged on the screw and working between said abutments carried by each blade.

4. A tobacco-pipe scraping tool comprising in combination a base having more than one flat face, said faces lying in planes which are parallel to each other in at least one dimension, a screw axially aligned with said base, said screw extending from the base parallel to said flat faces, a scraper blade mounted on each face of the base and guided to slide thereon in a direction inclined to the axis of the screw between closed and expanded positions in which latter positions operative edges of the blades project beyond the base faces, laterally extending heads formed on said blades, slots formed in said heads, and a nut engaged on the screw and working in said slots.

5. A tobacco-pipe scraping tool comprising in combination, a base of substantially rectangular form, an axially projecting screw on one end of said base, two substantially identical scraper blades slidably secured to the respective sides of said base, each of said blades having a body portion and a laterally extending head portion, said body portion conforming in general outline to the outline of said base and containing the scraping edge of said blade, and said head portion having a slot formed therein extending transverse to the longitudinal axis of said body portion, means for securing said blades to said base comprising holes in said base, transverse parallel slots formed in said blades and inclined towards the operative edges of said blades, pins fitted in said holes, said pins passing through said slots, washers on the end portions of said pins, the ends of said pins being upset over said washers to secure the blades to said base, and means for causing relative movement of the blades and base comprising a nut engaging said axially projecting screw and working in the slots of said blade heads.

6. A tobacco-pipe scraping tool comprising a flat-faced base, a scraper blade mounted on the base in sliding relation to the flat face, a pin-and-inclined-slot connection between the blade and the base, abutments on the blade, an axial screw on the base, and a nut on the screw working between the abutments, whereby rotation of the nut produces relative axial movement between the blade and the base, which movement, through the operation of the pin-and-slot connection, is accompanied by a transverse movement serving to project an operative edge of the blade beyond the base.

7. A tobacco-pipe scraping tool as in claim 6, wherein the abutments on the blade are formed by a transverse slot into which the nut enters, rotation of the nut in one or other direction causing the nut to bear on one or other edge of the slot.

8. A tobacco-pipe scraping tool comprising a base with a plurality of flat faces, a scraper blade mounted on each of the flat faces in sliding relation thereto, pin-and-inclined-slot connections between the base and the respective blades, abutments on the blades, an axial screw on the base, and a nut working on the screw between the abutments, whereby rotation of the nut produces relative axial movement between the blades and the base, which movement, through the pin-and-slot connection, is accompanied by a transverse movement serving to project an operative edge of each blade beyond the base.

9. A tobacco-pipe scraping tool comprising a base of metal strip, a screw projecting axially from one end of the base, two identical scraper blades mounted in sliding relation to the base, one on each side of the base, pin-and-inclined-slot connections between the base and the respective blades, abutments on the blades, and a nut working on the screw between the abutments, whereby rotation of the nut produces relative axial movement between the blades and the base, which movement, through the pin-and-slot connections, is accompanied by a transverse movement serving to project an operative edge of each blade beyond the base.

DONALD ASHFORD PALMER.

REFERENCES CITED

The following references are of record in the file of this patent:

UNITED STATES PATENTS

| Number | Name | Date |
| --- | --- | --- |
| 1,459,625 | Culliver | June 19, 1923 |
| 2,149,206 | Brinnon et al. | Feb. 28, 1939 |